Oct. 20, 1970   H. H. SEWARD   3,535,044
TOTAL ORGANIC CARBON COLORIMETER
Filed Oct. 22, 1969   2 Sheets-Sheet 1

INVENTOR.
HAROLD H. SEWARD
BY Jack Larsen
ATTORNEY

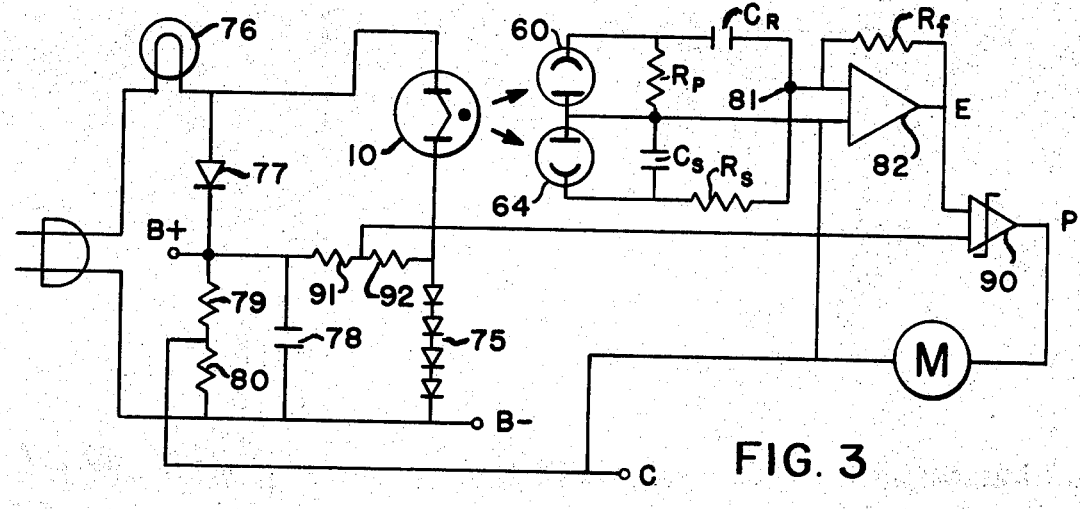
FIG. 3
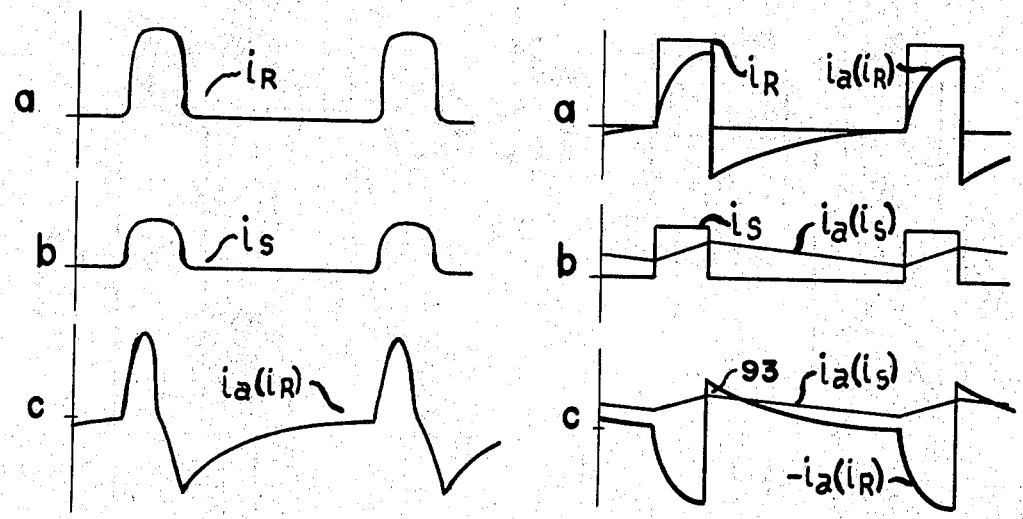
FIG. 4
FIG. 5
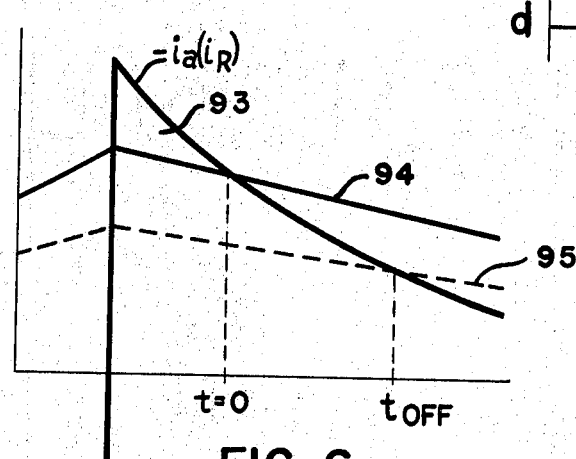
FIG. 6

United States Patent Office 3,535,044
Patented Oct. 20, 1970

3,535,044
TOTAL ORGANIC CARBON COLORIMETER
Harold H. Seward, 16 Frost St.,
Arlington, Mass. 02174
Filed Oct. 22, 1969, Ser. No. 868,318
Int. Cl. G01j *3/46, 3/48;* G01n *21/06*
U.S. Cl. 356—180            10 Claims

ABSTRACT OF THE DISCLOSURE

An instrument is disclosed for measuring the ultraviolet absorbance of a liquid sample. It is particularly adapted to measure total organic carbon content as a measurement of water purity. A simple quartz test tube functions as the sample container and the necessary lens system concentrating light from an ultraviolet "ozone lamp" through the sample to an ultraviolet detector. Rectified line current provides power for the ultraviolet source resulting in pulses at 60 herz frequency. Pulses derived respectively from the ultraviolet detector and from a reference detector, are compared to yield an electrical current proportional to the absorbance of the sample, which is logarithmically related to the transmittance and the sample detector current.

---

The invention relates to colorimeters and more particular to a colorimetric instrument especially adapted for the measurement of total organic carbon dissolved in water.

It is known that all organic compounds and all forms of life contain the element carbon in chemical combination. It has been found that a measurement of total organic carbon is a useful measure of available nutrients in the water. An exact analysis for organic carbon by conventional methods, as by oxidation to carbon dioxide, is cumbersome, and time consuming, therefore expensive. It has been found that generally there is a good correlation between the absorbtion of near ultraviolet light in water and its organic carbon content. By near ultraviolet is meant the range of 1800 to 4000 angstroms including the mercury lines at 1849, 1942, 2536, and 3650 angstroms especially the region around the 2536 line.

It has been found that even in distilled water, absorbtion at these wavelengths is predominantly by the small residue of dissolved organic carbon.

It is an object of this invention to provide a simple, convenient, practical, accurate and reliable instrument for the determination of total organic carbon by ultraviolet absorbtion.

A further object of the invention is to provide an electrical meter and circuitry which provides a reading proportion to the absorbance of the active wavelengths.

A further object is to provide an instrument which may be cleaned easily to accept new samples without contamination.

A further object is to provide an instrument having a sample chamber for holding the water under test which may be replaced quickly and at a minimum cost.

Another object is to provide an instrument of this kind which has reduced sensitivity to turbidity in the test solution.

A still further object is to provide an instrument which is adapted for solid state electronics for long life with no moving parts.

Another object is to provide an apparatus of the type described with inherent compensation for variations in source lamp intensity, line voltage, and amplifier gain.

A further object is to provide an instrument having a pulse-width output not effected by voltage levels and particularly adapted for digital transmission.

A feature by which these objects are achieved is the use of a simple quartz test tube as both lens and sample chamber.

A further feature of the invention is the use of photoelectric cells for both a sample and a reference path and the processing of one cell signal through a differentiating circuit and the other signal through an integrating circuit before comparing them to produce an output signal.

A still further feature of the invention is the excitation of the ultraviolet source lamp with rectified house current to provide pulses of light.

Another feature of an embodiment of the invention is a total internally reflecting mirror immersed in the sample.

Other objects and features of the invention will be apprehended from the following specification and the annexed drawings of which:

FIG. 3 is a schematic diagram of the circuit for the invention.

FIG. 4 is a set of wave-form diagrams for the circuit of FIG. 3.

FIG. 5 is an idealized set of wave-form diagrams illustrative of the circuit of FIG. 3, and FIG. 6 is a graph indicating relative wave-form changes illustrative of the logarithmic principle of the invention.

Figure 1:
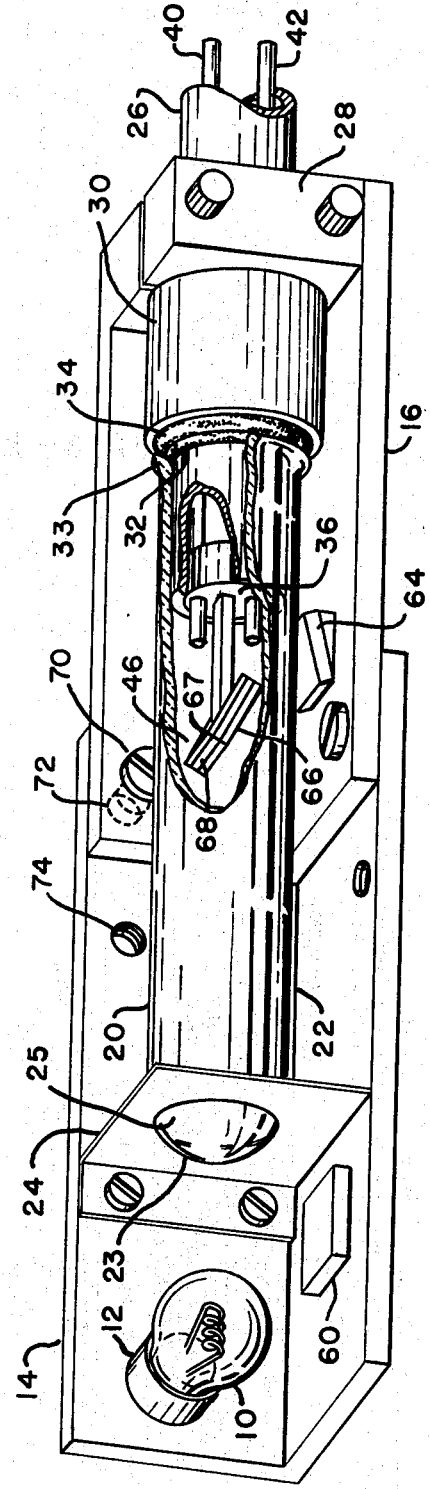
FIG. 1 is a partially cut-away view of the preferred embodiment of the invention.

Referring now to FIG. 1, a mercury lamp 10 such as G.E. type G4S11 ozone lamp is operated on rectified line current thereby having a single bright spot source of ultraviolet radiation. The lamp is fixed in a holder 12 to a source plate 14 which is moveably fixed to a base plate 16.

The base plate 16 supports a sample tube 20 which is an ordinary quartz test tube having a substantially cylindrical side wall 22 and a substantially hemispherical bottom 23. The bottom 23 of the tube rests against a holding clip 24 which has a hole 25 to admit a substantial portion of the bottom 23 and expose it to the lamp 10 while serving as an iris to block stray light from entering the tube 20 and to avoid using the more extreme outer curvature of the bottom. The tube 20 fits over a support tube 26 which is fixed to the base plate 16 by a clamp support 28. In the position shown, a gap selector tube 30 is slipped over the support tube 26 before the test tube 10. A pair of O-ring seals, a smaller cross-section ring 32 wedging into the flare 33 of the test tube mouth and a larger cross-section ring 34 urged by the gap selector tube 30 against the smaller ring 32 provide a water-tight seal between the support tube 26 and the sample tube 20. The support tube 26 is closed within the test tube 10 by a seal tube 36 which passes two small tubes 40 and 42 which provide an inlet and an outlet respectively for the water under test. The seal tube 36 also supports on a support bar 44, a mirror 46 inclined to intercept the test beam at an angle of incidence of substantially 60 degrees.

Light from the source lamp 10 falls in part upon a reference photocell assembly 60 and in part impinges on the bottom 23 of the test tube 20 passing through the hole 25. The lamp 10 is situated at the distance (approximately one inch) depending on the diameter of the tube, such that the light is directed against the mirror and deflected through the sidewall 22 against a signal photocell assembly 64. It is convenient and preferred to employ total internal reflection at the mirror 46. The mirror is made up of a thin quartz plate 66 spaced away from a backing plate 67 to form a sealed air chamber 68 behind the quartz plate. For quartz, water, and air, light directed at the mirror at an angle to be totally reflected impinges against the sidewall at less than the critical angle which is 48.6°.

Figure 2:
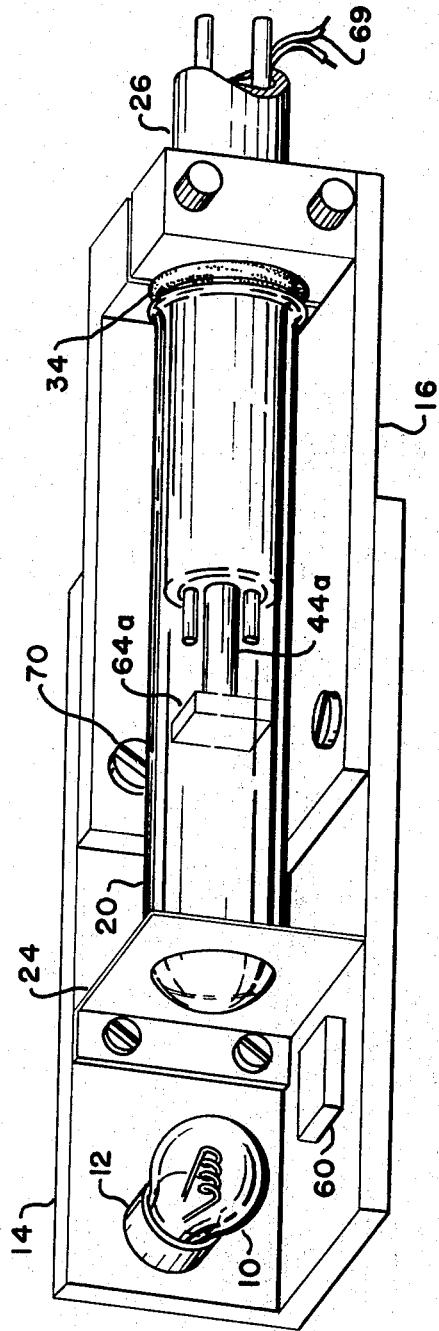
FIG. 2 is a partially cut-away view of an alternative embodiment of the invention.

In the embodiment of FIG. 2 the signal photocell assembly 64a is placed within the test tube fastened by a support piece 44a through which electrical connections 69 are carried into the support tube 26 and to other circuit parts as shown in FIG. 3.

The apparatus is designed to work with two different path lengths. By removing the gap selector tube 30 and moving the screw 70 from tapped hole 72 to tapped hole 74, the path length is changed to a shorter one for measuring solutions of greater absorbance.

It is appropriate at this time to define the terms "transmittance" and "absorbance" as used herein. Given a sample cell of water through which a beam is to be transmitted, then the transmittance is the ratio of the light received with the sample to the light received with a pure standard. Thus transmittance ranges from zero for opaque to unity for perfectly transparent. Thus if the signal photocell current $I_o$ is one unit for a pure standard, then the transmittance is the measured current I for any particular solution sample.

Thus transmittance T is defined as the ratio of two intensities $$t = I/I_o \quad (1)$$

Absorbance is defined in logarithmic terms.

$$A = -\log_{10} t \quad (2)$$
$$= -0.4343 \ln t \quad (3)$$

Because the absorbance is proportional to the concentration of absorbing organic carbon or other solute, the logarithmic measure is preferable for the indicating meter.

FIG. 3 is a circuit diagram of a detecting circuit that provides an output current directly proportional to absorbance A.

The gas discharge lamp 10 is supplied from a convenient alternating current source such as 115 v. 60 herz A.C. house current. A string 75 of silicon rectifiers, and a ballast lamp 76 are connected in series at either side of the discharge lamp. All three have mutually complementary sharply nonlinear current-voltage characteristics. The silicon rectifiers limit forward voltage to about ¾ volt each. The discharge lamp limits voltage to about 20 volts. Since some current flows through the filament of the lamp 10 before it reaches glow discharge voltage, the pulse width of voltage across the diode string 75 is slightly wider than the main current pulse through the discharge lamp 10. Accordingly the voltage across the string 75 is a convenient source of a squelch pulse to block the electronics during discharge as explained below. Because of their voltage-regulating properties, the voltage across the lamp 10 and string 75 is more constant in amplitude than the supply voltage, moreover it is of the proper value for supply of operational amplifiers. A rectifier 77 and capacitor 78 and resistors 79 and 80 provide B+, B— and common supply connections. With unidirectional current through the lamp 10, its output is in the form of pulses of ultraviolet emanating from one end of the filament. In the description below it will be assumed that the primary power is supplied at 110 v. 60 herz. An ordinary 40 watt incandescent lamp is a suitable ballast. The light is intercepted by the two photocell assemblies 60 and 64 of like construction. Photocells are known in the art that respond only to ultraviolet light; however these are not in mass production, so it is preferred to employ readily available photosensitive chips responsive to visible light. A chip may be assembled in a sandwich of phosphors and filters as follows to be responsive to only the ultraviolet rays of interest. Suitable filters are available from Jenaer Glaswerk Schott & Gens, Mainz, West Germany. The incident rays pass first through a filter such as Schott UG5 which blocks visible components but passes ultraviolet (U.V.) and infrared (I.R.) rays. Thus filtered, it enters a phosphor of the kind employed in fluorescent lights where the U.V. is converted to visible light, this light then passes through a second filter such as a Schott BG18 which attenuates red and longer wavelengths, then through a third filter, such as a Schott GG14 yellow filter that blocks violet components from which it then impinges on a silicon junction photocell wherein the light is converted linearly into electric current.

The action of the phosphor, lamp, and circuit response tend to smooth out the resulting current pulses, which have a substantially rectangular but generally rounded wave shape substantially as shown in FIG. 4(a) where $i_R$ indicates the reference cell current and in FIG. 4(b) where $i_S$ indicates the sample measuring cell current. To facilitate the following explanation, these pulses are idealized as rectangular pulses in the wave forms of FIGS. 5(a) and 5(b).

The current signal from the reference cell is differentiated by a capacitor $C_R$ and resistor $R_p$, the time constant $T_R$ of the combination being substantially less than the pulse period T(1⁄60 of a second) in order that the range of measurements be sufficient. For example for a range of transmittance of 100:1, the time constant $T_R$ should be less than one tenth the period T.

The current signal $i_S$ from the photocell assembly 64 is applied to an integrating circuit comprising resistor $R_S$ and capacitor $C_S$, the time constant $T_S = R_S C_S$ being longer than the pulse period T but short enough to follow changes in the organic content to be measured.

The differentiated and integrated signals are combined at a summing point 81 to provide a total amplifier input current signal $i_a$. The signal is applied to an operational amplifier 82 with feedback resistor $R_f$ so that the output voltage E of the amplifier is proportional to the input current $i_a$ thus $$E = -i_a R_f \quad (4)$$

FIG. 4b shows the relationship of idealized reference current $i_R$ and (after differentiation) its contribution $i_a(i_R)$ to the amplifier signal $i_a$, similarly the relation of $i_S$ and its contribution $i_a(i_S)$ to the amplifier signal $i_a$.

The average value of the differentiated signal $i_a(i_R)$ is necessarily zero, while the average value of the integrated signal $i_a(i_S)$ is necessarily positive.

The amplitude of the reference signal can be adjusted (with a shutter for example) so that its negative peak cancels the sample cell current for only a very short time when the sample cell current is at its maximum (corresponding to unity transmittance). As the sample cell current is diminished, this time increases nonlinearly in the desired way as will be shown. The pulses of current corresponding to negative values of $i_a$ are amplified and limited in the limiter amplifier 90 to which the squelch pulse suitably biassed by resistors 91 and 92 is also applied to delay the time for effective action until the exponential decay curve is pure enough. The output pulses P are applied to the meter M.

The lamp 10 is of the gas-discharge type and, as such, provides pulses approximating the square pulses illustrated in FIGS. 4(a) and (b). Mechanical chopping, electrical modulation of filaments, light-emitting solid-state diodes, and the like may also be used with proper consideration to the wave patterns developed. It will be noted that in its mode of operation this circuit employs the signals only during the "OFF" period of the source in order that the purest exponential be used. It is possible to apply a modified arrangement for comparing the signals during the on-time if the "ON" signal is constant in amplitude; but employing the analysis after the pulses are completed minimizes the effect of irregular pulse shapes.

The contribution to the amplifier input current $i_a$ due to the reference-signal current $i_R$ is shown.

In FIG. 5a the curve designated $i_a(i_R)$ represents the contribution to the amplifier input current $i_a$ from the reference signal current $i_R$, indicating the effect of the differentiation. Similarly, in FIG. 5b the idealized wave form of the sample current $i_S$ is shown together with the integrated wave form of its contribution $i_a(i_S)$ to the amplifier input current. FIG. 5c compares the integrated wave form $i_a(i_S)$ with the inverted differentiated wave form $-i_a(i_R)$, showing the region 93 for which $i_a$ is negative, from which the output pulses P shown in FIG. 5(d) are generated.

The on-time of the pulses P is the time during which the magnitude of the differentiated pulse excedes the magnitude of the coincident integrated pulse and may be expressed as a function of time $t$ from the start of the decaying exponential where the first term represents the contribution $i_a(i_R)$ from the reference current adjusted to unity amplitude, and the second term represents the contribution $i_a(i_S)$ from the signal current having a peak value or amplitude proportional to $t$ $$[\exp(-t/T_R) - T\exp(-t/T_S)] \leq 0, \quad T_R \quad (5)$$

where $t$ is the transmittance.

Referring to curve 94 in FIG. 6, when $t$ is unity, (absorbance zero) Equation 5 is satisfied for $t$ equal to zero only, no meter output results. The more transmittance $t$ drops below unity, as indicated by curve 95 the time $t$ increases from zero to some value $t_{off}$, and $$\exp(-t_{off}/T_R) - t\exp(-t_{off}/T_S) = 0 \quad (6)$$

$$\exp(-t_{off}/T_R) = t\exp(-t_{off}/T_S) \quad (7)$$

taking natural logarithms of both sides, $$t_{off}/T_R = -1nt + t_{off}/T_S \quad (8)$$

$$t_{off}(1/T_R - 1/T_S) = -1nt \quad (9)$$

Multiplying both sides by $\log_{10} e$ $$\log_{10} e(1/T_R - 1/T_S) t_{off} = (-\log_{10} e)(1nT)$$
$$= -\log_{10} t = A \quad (10)$$

or $$A = [\log_{10} e](1/T_R - 1/T_S) t_{off} \quad (11)$$

showing that the absorbance A cause a directly (linear) proportional increase of $t_{off}$. Since the on-time of P is equal to $t_{off}$, the meter reading is likewise proportional to absorbance. Moreover the output signal is remarkably independent of source intensity and line voltage fluctuation or change in amplifier gain.

In practice, the radiation pulses are not perfectly square so that the tip of the negative spike of the differentiated signal is not accurately exponential. Therefore it is desireable to delay the start of the limiting amplifier pulse by a squelch signal until the exponential decay is pure enough.

When a standard clear sample is introduced the radiation signals are balanced to cause an indication of the calibration value on the meter. With the solution to be tested in the cell the absorbance relative to the standard is indicated on the meter.

If it is desired to display transmittance as the measured variable this may be done by amplyfying measuring cell and reference cell currents linearly. While such a conventional arrangement may be balanced at any desired set point to compensate for lamp fluctuations, it lacks the benefits of pulse-width modulation which attain in the absorbance measurement. The same instrument readily may be switched from one mode of operation to the other.

It will also be apparent that the system here disclosed for comparing a reference pulse and a measuring pulse of current to achieve a logarithmic measure of a wide ranging variable may be applied to any of several other physical variables which are, or may be made proportional to a current pulse using transducers or pickups as known in the art. In particular electrical resistances are employed having a very wide range of values. An extended range ohmeter would have advantages in some fields of work.

Where the signal current is available as a steady current or voltage, integration is not necessary. The differentiated reference pluses may be compared directly with the signal current voltage.

It will be recognized that the word "quartz" herein follows its common usage, embracing polycrystaline fused silica. The birefringence of quartz as a mineral plays no part in this invention.

I claim:
1. In a colorimeter for testing a sample of liquid, the combination comprising
   a transparent container having a substantially hemispherical bottom and a substantially cylindrical side wall to contain said sample of liquid and an optical path through said hemispherical bottom along which a light beam can pass through a volume of said sample of liquid in said container,
   a source of light, said source of light comprising a discharge lamp,
   a first detector of light,
   means for positioning said source of light at one end of said optical path and said first detector at the other end of said optical path spaced such that said light beam is refracted at said bottom and at said substantially cylindrical side wall to concentrate light upon said first detector when said transparent container contains said sample of liquid,
   means for producing a reference pulse with a magnitude which decays exponentially with a time constant $T_R$ within a sampling period of duration T, greater than $T_R$,
   means for producing from said first detector a signal of amplitude proportional to the transmittance of said volume and relatively steady in magnitude over said period T,
   means for comparing the magnitude of said reference pulse to the magnitude of said signal whereby to produce an output pulse for such time that the magnitude of said reference pulse excedes the magnitude of said signal,
   and means for utilizing said output pulse whereby the duration of said output pulse is an indication of the light absorbance of said sample.

2. In a colorimeter for testing a sample of liquid, the combination comprising
   a transparent container having a substantially hemispherical bottom and a substantially cylindrical side wall to contain said sample of liquid and an optical path through said hemispherical bottom along which a light beam can pass through a volume of said sample of liquid in said container,
   a source of light comprising a mercury-vapor discharge lamp,
   a first detector of light,
   a second detector of light,
   means for positioning said source of light at one end of said optical path and said first detector at the other end of said optical path spaced such that said light beam is refracted at said hemispherical bottom and at said substantially cylindrical side wall to concentrate light upon said detector when said transparent container contains said sample of liquid,
   means for positioning said second detector of light to be directly exposed by said source of light,
   means for forming an output from said first detector as a series of substantially rectangular signal-current pulses having a regular period T and an amplitude proportional to the transmittance of said sample of fluid,
   means for forming an output from said second detector as a series of substantially rectangular reference-current pulses coincident with said signal pulses and having said period T,
   first modifying means for producing from said signal-current pulses a modified signal relatively steady in magnitude over said period T,
   second modifying means for producing from each said reference-current pulse a modified reference pulse, the magnitude of which decays exponentially with a time constant $T_R$ substantially less than said period T, means for continuously comparing the magnitude of said modified signal to the magnitude of said modified reference pulses, and means for generating output current pulses of constant amplitude, of said repetition period T, but with a duration equal to the time during which the magnitude of each of said modified reference pulses exceeds the magnitude of said modified signal, and means for utilizing said output current pulses whereby the duration of said output current pulses is an indication of the absorbance of said sample.

3. In a colorimeter for testing a sample of liquid, the combination comprising a transparent container having a substantially hemispherical bottom and a substantially cylindrical side wall to contain said sample of liquid and an optical path through said hemispherical bottom along which a light beam can pass through a volume of said sample of liquid in said container, a source of light comprising a mercury-vapor discharge lamp, a first detector of light, a second detector of light, means for positioning said source of light at one end of said optical path and said first detector at the other end of said optical path spaced such that said light beam is refracted at said hemispherical bottom and at said substantially cylindrical side wall to concentrate light upon said first detector when said transparent container contains said sample of light, means for positioning said second detector of light to be directly exposed to said source of light, means for forming an output from said first detector as a series of substantially rectangular signal-current pulses having a regular period T and an amplitude proportional to the transmittance of said volume, means for forming an output from said second detector as a series of substantially rectangular reference current pulses coincident with said signal pulses and having said period T, first modifying means for producing from said signal-current pulses a modified signal relatively steady in magnitude over said period T, second modifying means for producing from each of said reference-current pulses a modified reference pulse, the magnitude of which decays exponentially with a time constant $T_R$, substantially less than said period T, means for continuously comparing the magnitude of said modified signal to the magnitude of said modified reference pulses, means for generating output current pulses of constant amplitude, of said repetition period T, but with a duration equal to the time during which the magnitude of each said modified reference pulse exceeds the magnitude of said modified signal, and means for utilizing said output current pulses whereby the duration of said output current pulses is an indication of the absorbance of said sample.

4. The combination as defined by claim 3, wherein said first modifying means comprise a resistor and a capacitor proportioned so that said modified signal magnitude decays exponentially wtih a time constant $T_S$ greater than the period T.

5. The combination as defined by claim 3 wherein said first modifying means comprises an integrating circuit and said second modifying means comprises a differentiating circuit.

6. In a colorimeter for testing a sample of liquid, the combination comprising a transparent container having a substantially hemispherical bottom to contain said sample of liquid and an optical path through said hemispherical bottom along which a light beam can pass through a volume of said sample of liquid in said container, a source of light, said source of light comprising a discharge lamp, a first detector of light, means for positioning said source of light at one end of said optical path and said detector within said sample at the other end of said optical path spaced such that said light beam is refracted at said hemispherical bottom to concentrate light upon said detector when said transparent container contains said sample of liquid, means for producing a reference pulse with a magnitude which decays exponentially with a time constant $T_R$ within a sampling period of duration T, greater than $T_R$, means for producing from said first detector a signal of ampltiude proportional to the transmittance of said volume and relatively steady in magnitude over said period T, means for comparing the magnitude of said reference pulse to the magnitude of said signal whereby to produce an output pulse for such time that the magnitude of said reference pulse exceeds the magnitude of said signal, and means for utilizing said output pulse whereby the duration of said output pulse is an indication of the absorbance of said sample.

7. In a colorimeter for testing a sample of liquid, the combination comprising a transparent container having a substantially hemispherical bottom to contain said sample of liquid and an optical path through said hemispherical bottom along which a light beam can pass through a volume of said sample of liquid in said container, a source of light comprising a mercury-vapor discharge lamp, a first detector of light, a second detector of light, means for positioning said source of light at one end of said optical path and said first detector within said sample of liquid and at the other end of said optical path spaced such that said light beam is refracted at said hemispherical bottom and at said substantially cylindrical side wall to concentrate light upon said first detector when said transparent container contains said sample of liquid, means for positioning said second detector of light to be directly exposed by said source of light, means for forming an output from said first detector as a series of substantially rectangular signal-current pulses having a regular period T and an amplitude proportional to the transmittance of said sample of fluid, means for forming an output from said second detector as a series of substantially rectangular reference-current pulses coincident with said signal-current pulses and having said period T, first modifying means for producing from said signal-current pulses a modified signal relatively steady in magnitude over said period T, second modifying means for producing from each said reference-current pulse a modified reference pulse, the magnitude of which decays evponentially with a time constant $T_R$ substantially less than said period T, means for continuously comparing the magnitude of said modified signal to the magnitude of said modified reference pulses, means for generating output current pulses of constant amplitude, of said repetition period T, but with a duration equal to the time during which the magnitude of each of said modified reference pulses exceeds the magnitude of said modified signal, and means for utilizing said output current pulses whereby the duration of said output current pulses is an indication of the absorbance of said sample.

8. In a colorimeter for testing a sample of liquid, the combination comprising a transparent container having a substantially hemispherical bottom to contain said sample of liquid and an optical path through said hemispherical bottom along which a light beam can pass through a volume of said sample of liquid in said container, a source of light comprising a mercury-vapor discharge lamp, a first detector of light, a second detector of light, means for positioning said source of light at one end of said optical path and said first detector within said sample of liquid and at the other end of said optical path spaced such that said light beam is refracted at said hemispherical bottom to concentrate light upon said first detector when said transparent container contains said sample of light, means for positioning said second detector of light to be directly exposed to said source of light, means for forming an output from said first detector as a series of substantially rectangular signal-current pulses having a regular period T and an amplitude proportional to the transmittance of said volume, means for forming an output from said second detector as a series of substantially rectangular reference current pulses coincident with said signal pulses and having said period T, first modifying means for producing from said signal-current pulses a modified signal relatively steady in magnitude over said period T, second modifying means for producing from each of said reference-current pulses a modified reference pulse, the magnitude of which decays exponentially with a time constant $T_R$, substantially less than said period T, means for continuously comparing the magnitude of said modified signal to the magnitude of said modified reference pulses, means for generating output current pulses of constant amplitude, of said repetition period T, but with a duration equal to the time during which the magnitude of each said modified reference pulse exceeds the magnitude of said modified signal, and means for utilizing said output current pulses whereby the duration of said output current pulses is an indication of the absorbance of said sample.

9. The combination as defined by claim 8 wherein said first modifying means comprise a resistor and a capacitor proportioned so that said modified signal magnitude decays exponentially with a time constant $T_S$ greater than the period T.

10. The combination as defined by claim 8 wherein said first modifying means comprises an integrating circuit and said second modifying means comprises a differentiating circuit.

References Cited

UNITED STATES PATENTS

| | | |
|---|---|---|
| 2,899,858 | 8/1959 | Stott. |
| 3,281,828 | 10/1966 | Kaneko. |

FOREIGN PATENTS

| | | |
|---|---|---|
| 1,187,698 | 9/1959 | France. |
| 977 | 4/1872 | Great Britain. |

RONALD L. WIBERT, Primary Examiner

W. A. SKLAR, Assistant Examiner

U.S. Cl. X.R.

23—252; 73—423; 250—218; 356—188, 195, 208, 246